US007740915B2

(12) United States Patent
Cavero et al.

(10) Patent No.: US 7,740,915 B2
(45) Date of Patent: Jun. 22, 2010

(54) PROCESS FOR COATING A SUBSTRATE WITH A COATING INCLUDING A FLUOROPOLYMER, THERMOPLASTIC POLYMER, AND FILLER

(75) Inventors: Jose Cavero, Chicago, IL (US); Peter L Huesmann, Palatine, IL (US)

(73) Assignee: Whitford Worldwide Company, Elverson, PA (US)

( * ) Notice: Subject to any disclaimer, the term of this patent is extended or adjusted under 35 U.S.C. 154(b) by 128 days.

(21) Appl. No.: 11/913,686

(22) PCT Filed: May 8, 2006

(86) PCT No.: PCT/US2006/017556

§ 371 (c)(1),
(2), (4) Date: Nov. 6, 2007

(87) PCT Pub. No.: WO2006/121940

PCT Pub. Date: Nov. 16, 2006

(65) Prior Publication Data

US 2008/0274295 A1 Nov. 6, 2008

Related U.S. Application Data

(60) Provisional application No. 60/678,908, filed on May 6, 2005.

(30) Foreign Application Priority Data

Jun. 28, 2005 (EP) .................................. 05105761

(51) Int. Cl.
*B05D 1/38* (2006.01)
*B05D 1/06* (2006.01)
(52) U.S. Cl. ........................ 427/470; 427/475; 427/202; 427/203
(58) Field of Classification Search ................. 427/470, 427/202
See application file for complete search history.

(56) References Cited

U.S. PATENT DOCUMENTS

| | | | |
|---|---|---|---|
| 3,677,471 A | 7/1972 | Deakin | |
| 4,351,882 A | 9/1982 | Concannon | |
| 4,421,795 A * | 12/1983 | Davies | 427/385.5 |
| 4,578,427 A | 3/1986 | Saito et al. | |
| 4,749,752 A | 6/1988 | Youlu et al. | |
| 4,777,214 A | 10/1988 | Petersen | |
| 4,897,439 A | 1/1990 | Rau et al. | |
| 4,898,779 A | 2/1990 | Yoshimura et al. | |
| 4,914,158 A | 4/1990 | Yoshimura et al. | |
| 4,977,221 A | 12/1990 | Yoshimura et al. | |
| 5,009,959 A | 4/1991 | Yoshimura et al. | |
| 5,030,394 A | 7/1991 | Sietses et al. | |
| 5,087,680 A | 2/1992 | Duan et al. | |
| 5,093,403 A | 3/1992 | Rau et al. | |
| 5,106,682 A | 4/1992 | Matsushita et al. | |
| 5,229,460 A | 7/1993 | Yousuf et al. | |
| 5,250,356 A | 10/1993 | Batzar | |
| 5,346,727 A | 9/1994 | Simkin | |
| 5,397,831 A | 3/1995 | Saito et al. | |
| 5,405,912 A | 4/1995 | Simkin | |
| 5,478,651 A | 12/1995 | Tannenbaum | |
| 5,536,583 A | 7/1996 | Roberts et al. | |
| 5,691,067 A * | 11/1997 | Patel | 428/447 |
| 5,710,205 A | 1/1998 | Davies et al. | |
| 5,726,232 A | 3/1998 | Egami et al. | |
| 5,846,645 A | 12/1998 | Yokota et al. | |
| 5,880,205 A | 3/1999 | Tannenbaum | |
| 5,886,066 A * | 3/1999 | Forschirm | 523/200 |
| 6,017,640 A * | 1/2000 | Muthiah et al. | 428/514 |
| 6,232,372 B1 | 5/2001 | Brothers et al. | |
| 6,265,492 B1 | 7/2001 | Lahijani | |
| 6,312,814 B1 | 11/2001 | Kolouch | |
| 6,518,349 B1 | 2/2003 | Felix et al. | |
| 6,579,942 B2 | 6/2003 | Lahijani | |
| 6,846,570 B2 | 1/2005 | Leech et al. | |
| 6,863,974 B2 | 3/2005 | Shah et al. | |
| 7,026,036 B2 | 4/2006 | Leech et al. | |
| 2001/0021679 A1 | 9/2001 | Ohira et al. | |
| 2004/0071987 A1 | 4/2004 | Bate | |
| 2004/0253387 A1 | 12/2004 | Cavero | |
| 2006/0110601 A1 | 5/2006 | Hennessey | |

FOREIGN PATENT DOCUMENTS

| | | |
|---|---|---|
| CN | 1100124 A | 3/1995 |
| CN | 1100124 (D2) | 3/1995 |
| EP | 0 192 397 A1 | 8/1986 |

(Continued)

OTHER PUBLICATIONS

International Search Report for International Application No. PCT/US2006/017556, Sep. 11, 2006.
English Translation of CN1100124A (D2); pp. 4, Mar. 1995.
English Translation of D1 "Polyphenyl Sulfide Powder Coatings and Other Plastic Power Coatings—Coating Technology of Steel Pipe (4)," pp. 1-7.
Bai Yongqing et al., "Polyphenyl Sulfide Powder Coatings and Other Plastic Powder Coatings . . . ," Steel Pipe, vol. 29, No. 4, pp. 57-59 (Aug. 2000) (D1).
H. Wayne Hill, Jr. et al., "Characterization of Polyphenylene Sulfide Coatings," Organic Coatings and Plastics Chemistry Div. of the Amer. Chem. Society, 6 pgs (Sep. 1976).
Blackwell et al., "Comparison of Electrostatic Spray-Applied Powder Coatings," Organic Coatings and Plastics Chemistry Div. of the American Chemical Society, 4 pgs (Mar. 1978).

(Continued)

*Primary Examiner*—Frederick J Parker
(74) *Attorney, Agent, or Firm*—Baker & Daniels LLP

(57) ABSTRACT

A process for coating a substrate with a coating comprising sequential steps of coating the substrate with mixtures of powders of fluoropolymers, thermoplastic polymers, perfluoropolymers and inorganic fillers of certain particle sizes. The coated substrate has the property of strongly adhering to a topcoat comprising a perfluoropolymer.

7 Claims, No Drawings

FOREIGN PATENT DOCUMENTS

| | | |
|---|---|---|
| EP | 0 259 290 B1 | 3/1988 |
| EP | 0259290 A2 | 3/1988 |
| EP | 0 284 996 A2 | 10/1988 |
| EP | 0 456 018 B1 | 11/1991 |
| EP | 0456018 A1 | 11/1991 |
| EP | 0 572 764 A2 | 12/1993 |
| EP | 1 078 961 A1 | 2/2001 |
| GB | 2 262 100 A | 6/1993 |
| JP | 50-7125 | 6/1975 |
| JP | 53-58544 | 5/1978 |
| JP | 54-26827 | 2/1979 |
| JP | 56-168858 | 12/1981 |
| JP | 60-5355 | 1/1985 |
| JP | 61-138567 | 6/1986 |
| JP | 63-251477 | 10/1988 |
| JP | 64-6828 | 1/1989 |
| JP | 1-155969 | 6/1989 |
| JP | 2-11666 | 1/1990 |
| JP | 2-45546 | 2/1990 |
| JP | 4-99544 | 3/1992 |
| JP | 5-293439 | 11/1993 |
| RU | 2 223 994 C2 | 6/2003 |
| WO | WO 03/015935 A1 | 2/2003 |
| WO | WO 2004/005394 A1 | 1/2004 |
| WO | WO 2004/025387 | 3/2004 |
| WO | WO 2004/108816 A2 | 12/2004 |
| WO | WO 2004/108842 A1 | 12/2004 |
| WO | WO 2005/058389 A1 | 6/2005 |
| WO | WO 2006/081801 A1 | 8/2006 |
| WO | WO 2006/117512 A1 | 11/2006 |

OTHER PUBLICATIONS

PPS Technews; vol. 1, Issue 2; produced by Phillips Chemical Company (Feb. 1995); 4 pgs.

Nicholas P. Liberto, PE. "Powder Coating," The Complete Finisher's Handbook; pp. 12-13 (1994).

Roger F. Jones, "Strategic Management for the Plastics Industry," pp. 37-39 (2003).

Charles Forman, "High-Performance Films." U.S. Materials, Applications, Markets, p. 94 (1996).

Abstract of Japanese Patent No. 04-227743, Aug. 17, 1992.

Derwent Abstract No. 98-537613/46 of Japanese Patent No. 10237254-A, 1998.

Abstract of Japanese Patent No. 60-155275, Aug. 15, 1995.

Derwent Abstract No. 269198/14 of Japanese Patent No. 5 4026-827, Feb. 1979.

Derwent Abstract No. 97-038118/04 of Japanese Patent No. 08295828-A, 1997.

Derwent Abstract No. 1975-82323 of Japanese Patent No. 50071725, Jun. 1975.

Derwent Abstract No. 1978-48448A of Japanese Patent No. 53058544, May 1978.

Derwent Abstract No. 1979-26919B of Japanese Patent No. 54026827, Feb. 1979.

Derwent Abstract No. 1982-10787E of Japanese Patent No. 56168858, Dec. 1982.

Derwent Abstract No. 85-060201/10 of Japanese Patent No. 5005-355-B, Feb. 1985.

Derwent Abstract No. 86-207345/32 of Japanese Patent No. 1138-567-A, Jun. 1986.

Derwent Abstract No. 88-340856/48 of Japanese Patent No. 3251-477-A, Oct. 1988.

Derwent Abstract No. 89-067132/09 of Japanese Patent No. 9006-828-B, Jun. 1989.

Derwent Abstract No. 89-217418/30 of Japanese Patent No. 1155-969-A, Jul. 1989.

Derwent Abstract No. 90-056264/08 of Japanese Patent No. 2011-666-A, Jan. 1990.

Derwent Abstract No. 90-094617/13 of Japanese Patent No. 2045-546-A, Feb. 1990.

Derwent Abstract No. 92-170375/21 of Japanese Patent No. 04099544-A, Mar. 1992.

Derwent Abstract No. 93-391904/49 of Japanese Patent No. 05293439-A, Jan. 1993.

International Search Report for PCT Application No. PCT/US2004/017733, dated Oct. 18, 2004.

International Preliminary Report for PCT Application No. PCT/US2006/017556 dated Nov. 6, 2007.

Board of Appeals Decision mailed Jul. 13, 2009 in U.S. Appl. No. 10/860,957.

\* cited by examiner

PROCESS FOR COATING A SUBSTRATE WITH A COATING INCLUDING A FLUOROPOLYMER, THERMOPLASTIC POLYMER, AND FILLER

This case was filed under the Patent Cooperation Treaty on May 8, 2006 and claims priority of U.S. Provisional Application No. 60/678,908 filed on May 6, 2005, and European Application No. 05105761.0 filed on Jun. 28, 2005.

CROSS REFERENCE TO RELATED APPLICATIONS

Priority of this application is based on Provisional Application Ser. No. 60/678,908, filed May 6, 2005, incorporated by reference herein.

BACKGROUND OF THE INVENTION

1. Field of the Invention

This invention relates to the application of non-stick coatings to a substrate.

2. Prior Art

The blending together of powders of fluoropolymers and thermoplastic polymers, as well as inorganic fillers of pigments, followed by application of the powder mixture to a metal substrate and fusing the applied powder to form a uniform coating on the substrate is well known from publications such as WO 2005/58389.

The application of multiple layers of various fluororesins and thermoplastic polymers is also known from publications such as WO 2003/015935.

The present invention is based on the discovery of a process comprising a unique combination of sequential steps whereby multiple layers of mixtures of fluoropolymers and thermoplastic polymers, inorganic fillers and perfluoropolymers are applied to a substrate.

SUMMARY OF THE INVENTION

Accordingly, the present invention comprises a process for coating a substrate with a coating comprising a fluoropolymer. The process comprises the sequential steps of:

a. Preparing a solid mixture comprising one or more fluoropolymers and one or more thermoplastic polymers thermally stable at temperatures in excess of 400° C.;

b. Melt blending and extruding the solid mixture at a temperature of from about 250° C. to about 400° C. to achieve homogeneity;

c. Subjecting the extrudate to mechanical means to obtain a powder of up to about 100 microns average particle size;

d. Blending the resulting powder with an inorganic filler with an average particle size between about 5 and 100 microns, and a perfluoropolymer powder with a particle size between about 5 and 100 microns to the blend of step c. to obtain a powder coating; the inorganic filler and perfluoropolymer being blended with the powder of step c. at the same time, or the inorganic filler blended before the perfluoropolymer, or the perfluoropolymer blended before the inorganic filler;

e. Applying the powder coating onto the substrate; and f. Heating the substrate to a temperature sufficient to cause the powder to partially coalesce.

Other embodiments of the invention are related to details concerning the process and materials employed.

DETAILED DESCRIPTION OF THE INVENTION

The process of the present invention is based on the unique combination of steps, materials and conditions that result in a multi layer non-stick coating with excellent adhesion between base and top coat.

The present invention advantageously provides a VOC free coating system. The liquid primers that are presently commercial are solvent based and thus have an undesirable high VOC content. Even a water-base system contains an appreciable level of VOC.

The invention also reduces the process to one that is a complete powder process. In addition to reducing VOC, this reduces the amount and complexity of equipment that the coating applicator must maintain.

The powder primer for non-stick powder coatings of the present invention is based on powders of fluoropolymers, thermoplastic polymers and perfluorinated polymers, as well as an inorganic filler. This differs from powder coatings based on FEP (co-polymer of hexafluoropropylene and tetrafluoroethylene) or PFA (co-polymer of perfluoropropylvinyl ether and tetrafluoroethylene) used commercially with solvents. The method of converting these materials of the invention into a powder coat is to blend the materials followed by co-extrusion and then grinding to the desired particle size.

With regard to the basecoat, and the use of fluoropolymers and thermoplastic polymers, the technology of this invention is similar to but not the same as that described in patent application U.S. 2004/0253387 A1, incorporated herein by reference. However, if the invention described in that patent application was used as a base coat for powder coatings, there would be a deficiency in intercoat adhesion between the base coat and a perfluoropolymer powder top-coat. The top coat, typically PFA, FEP and/or MFA (a copolymer of tetrafluoroethylene and perfluoromethylvinyl ether), would literally delaminate when tested by basic adhesion tests (cross-hatch and nail adhesion).

The coating of the present invention may be used with a substrate of any desired hardness. The type of substrate to which the coating is applied, and the shape into which it is formed, does not limit the scope of the invention. In a preferred embodiment, the non-stick coating of the present invention is used to coat a metal substrate, such as steel or aluminum, that is formed into cookware. It is highly preferred that the substrate be pretreated for improved adhesion of the base coat, such as by chemical etching or sandblasting. Sandblasting is best.

This invention uses two approaches to improve intercoat adhesion. One approach to improve the intercoat adhesion is to create a rough surface on the base coat which creates a mechanical bond between the base-coat (Primer) and the top-coat, the smaller the particle size the less rough the surface of the basecoat and the poorer the intercoat adhesion. This rough surface and improved mechanical adhesion can be obtained by blending an inorganic filler, such as a pigment, which has a particle size that will result in a rough surface when the primer is applied and baked, to the extruded and ground powder coating. One example of such a pigment is an aluminum flake that has been bonded to the powder base coat.

In this way when the resulting powder primer is applied to a metal substrate and cured followed by application of the powder top-coat and cured, the bond between the base and the top coat are strong enough to pass subjection to boiling water, cross hatch and adhesion tape testing. However, by itself the coating prepared in this manner will fail intercoat adhesion when tested by the standard post-boiling water finger nail adhesion test.

The second approach to improve intercoat adhesion is to blend a powder that is to comprise the base coat, that may comprise FEP, PFA and MFA of a particle size similar to that of the topcoat that is to be applied to the base-coat. This promotes a much tighter bond between the base and the topcoat, by means of chemical and mechanical bonds. Adhesion of base and top coat are improved to the point that the resulting coating passes boiling water, cross hatch and tape test, as well as the finger nail test, which is very important for most of industrial applications such as in coatings for commercial bake-ware.

One or both of the above approaches may be employed, but the best adhesion is obtained by using both approaches.

As used herein the term "similar" with regard to particle size means that the average diameter of the particles in question is not more than 50%, larger or smaller, than the average diameter of the particles to which it is being compared.

To form the base coat, the present invention effects melt blending a fluoropolymer and thermoplastic polymer at a temperature of from about 250° C. to about 400° C. to achieve homogeneity. It is preferred that the amount of fluoropolymer in the resulting solid mixture be from about 5 wt. % to about 50 wt. %, and the amount of thermoplastic polymer in the solid mixture be from about 50 wt. % to about 95 wt. %, the solid mixture blended and extruded with a twin-screw extruder at a preferred temperature of from about 250-400° C. The extrudate may be ground to a powder of up to about 100 microns average particle size, in air at a temperature of from about –10-20° C.

The powder is then blended with an inorganic filler, such as a pigment, with an average particle size between about 5 and 100 microns, and a perfluoropolymer powder with a particle size between about 5 and about 100 microns to obtain a powder coating. The inorganic filler and perfluoropolymer may be blended with the powder of the ground extrudate at the same time, or the inorganic filler blended before the perfluoropolymer, or the perfluoropolymer blended before the inorganic filler. It is preferred that the particle size of the inorganic filler powder is similar to the particle sizes of the polymer powders.

The inorganic filler/polymer blend may be bonded prior to step e., whereby the blend is heated until the polymer particles become sufficiently tacky to stick to the inorganic filler particles.

Preferred fluoropolymers for use in the invention may be selected from the group consisting of PTFE (Polytetrafluoroethylene), copolymers of TFE (Tetrafluoroethylene) with such co-monomers as PMVE (perfluoromethylvinylether), PPVE (perfluoropropylvinyl ether), HFP (hexafluoropropylene), Ethylene, CTFE (Chlorotrifluoroethylene) and combinations of the above comonomers.

Preferred thermoplastic polymers for use in the invention may be selected from the group consisting of Polyether Sulfones (PES), Polyarylsulfones (PAS), Polyphenyl Sulfide (PPS), Polyetheretherketones (PEEK), Polyimides (PI and Polyamideimides (PAI). PPS is most preferred.

Inorganic fillers that may be used in the invention include mica methasilicate or wollostonite, talc and aluminum flakes. Aluminum flakes are most preferred. An example is aluminum flakes manufactured by Alcon-Toya, known as PCF 7130. It is advantageous to coat the aluminum flakes with an acrylic resin.

It is preferred that the average particle size of the inorganic filler is equal to or greater than the thickness of the coating on the substrate following step f.

The powder mixture is then applied to the substrate, preferably electrostatically in a layer of about 20-60 microns thick, but may be up to 100 microns thick, depending on the application, and the substrate heated to a temperature sufficient to cause the powder to partially coalesce (melt only to the extent that the powder particles will adhere to each other), usually from about 370° C. to about 415° C.

To form the top coat, a perfluoropolymer powder is then applied to the coated substrate, and the substrate again heated, also usually at a temperature of from about 370° C. to about 415° C., to cause the perfluoropolymer powder to become sufficiently fluid and bond to the first layer. As previously mentioned, the powder that forms the top coat is preferably of a particle size similar to the powders that form the base coat.

Preferred perfluoropolymers for use in the invention, both in the base coat and top coat, are PFA, FEP and MFA, PFA most preferred because of its physical properties (toughness, release properties, etc.).

Once the base coat is applied, it may be flashed off for 2-3 minutes at a temperature of from about 370-400° C. The top coat may then be applied followed by a final cure at 400° C. for about 10 minutes. IF a flash off is not employed, the final cure can be done for 10 minutes at a temperature of from about 400-425° C., preferably about 415° C.

In the following non-limiting examples a substrate was coated with various base coats, only one of which was prepared in accordance with the present invention, and subjected to three tests to determine how well a perfluoropolymer topcoat would adhere to the base coats. The first test was a pencil test in which pencil leads of various hardness were drawn over the coating surface and it was observed whether the topcoat, when cut, would delaminate from the base coat. In the second test a ball point pen was pushed into the coating with various pressures to make the same determination. The third test was the fingernail test to determine whether the top coat could be peeled off using the tester's fingernail, first easily peeled off with a fingernail, and, second, peeled off with a fingernail after coated panels were immersed for 30 minutes in boiling water.

EXAMPLE 1

In this example all requirements of the invention were satisfied, except that no filler was used and no perfluoropolymer was blended with the powdered extrudate.

EXAMPLE 2

In this example all requirements of the invention were satisfied, except that no perfluoropolymer was blended with the powdered extrudate.

EXAMPLE 3

This example illustrates the invention in all respects.

The following table summarizes the materials employed in the above Examples:

| Raw Materials (parts per hundred, by weight) | Ex 1 | Ex 2 | Ex 3 |
|---|---|---|---|
| a. Blend the above materials and extrude. | | | |
| Ryton V1 | 75.99 | 72.3 | 68.76 |
| PTFE TL-1 | 19.93 | 18.96 | 18.03 |
| Channel Black | 2.39 | 2.27 | 2.16 |
| Neocryl BT-44 | 1.56 | 1.43 | 1.36 |
| b. Blend the following material(s) with the extruded chip and grind. | | | |
| Fume silica | 0.19 | 0.19 | 0.18 |
| c. Bond the grind with the following aluminum flake by Benda-Lutz Process | | | |
| PCF 7130 Non Leafing Aluminum Flake | | 4.85 | 4.76 |
| d. Blend with the following powder | | | |
| Hyflon ® PFA 7010 | | | 4.76 |
| TOTAL | 100 | 100 | 100 |

RAW Material Description:
Ryton V1 is a low viscosity Polyphenylene Sulfide made by Chevron-Phillips of Bartlesville, Oklahoma.
PTFE TL 10 is a fluoropolymer, best known as Polytetrafluoroethylene. It is made by AGC Chemicals Americas, Inc of Downningtown, Pennsylvania.
Channel Black is a micropulverized channel carbon black sold by Keystone Aniline Corp. of Chicago, Illinois, used only to impart color.
Neocryl BT-44 is a water based acrylic latex produced at 45% solids by NeoResins Inc., which is a business unit of DSM.
Fume silica, produced by Cabot Corp. or Degussa, is an additive used to improve the spray application of powder coatings.
PCF 7130 is a non-leafing aluminum flake pigment produced by Toyal America Inc. This pigment has a particle size with a D50 of 23 microns.
Hyflon ® PFA 7010 is a copolymer of tetrafluoroethylene and perfluoropropylvinyl ether which has a partical size with a D50 of 38 microns.

In Examples 1 to 3 the grind produced after step c had a particle size with a D50 (about 50% of the particles are of the specified diameter) of 22 microns, the extrusion temperature was 300° C., with an air temperature of −1° C. The particle size of the perfluoropolymer comprising the topcoat was about 20-25 microns.

With regard to the pencil test, the hardness of the leads was B, HB and F, in ascending order of hardness.

With regard to the ball point pen test, the pressures employed were 20, 50 and 70 psi.

The following Table summarizes the results:

| | Example 1 | Example 2 | Example 3 |
|---|---|---|---|
| Pencil test | Passed only hardness B | Passed only hardness B and HB | Passed B, HB and F |
| Ball point pen test | Passed only up to 20 psi | Passed only up to 50 psi | Passed 70 psi |
| Fingernail test | Failed | Passed | Passed |
| Fingernail followed by boiling water test | Failed | Failed | Passed |

Only the coating of Example 3 passed all tests, whereby the topcoat did not delaminate or peel off.

We claim:

1. A process for coating a substrate with a coating comprising a fluoropolymer, said process comprising the sequential steps of:
   a. Preparing a solid mixture comprising one or more fluoropolymers and one or more thermoplastic polymers thermally stable at temperatures in excess of 400° C.;
   b. Melt blending and extruding said solid mixture at a temperature of from about 250° C. to about 400° C. to achieve homogeneity;
   c. Subjecting the extrudate to mechanical means to obtain a powder of up to about 100 microns average particle size;
   d. Blending the resulting powder with an inorganic filler with an average particle size between about 5 and 100 microns, and a perfluoropolymer powder with a particle size between about 5 and 100 microns to the blend of step c. to obtain a powder coating; said inorganic filler and perfluoropolymer being blended with the powder of step c. at the same time, or the inorganic filler blended before the perfluoropolymer, or the perfluoropolymer blended before the inorganic filler;
   e. Applying said powder coating onto said substrate;
   f. Heating said substrate to a temperature sufficient to cause said powder to partially coalesce;
   g. Applying a perfluoropolymer powder coating to the coated substrate from step f; and
   h. Again heating said substrate to cause the powder to become sufficiently fluid and bond as a second layer to the first layer.

2. The process of claim 1 wherein said powder coating of step e, is applied electrostatically in a layer of about 20-100 microns thick.

3. The process of claim 2 wherein the average particle size of said inorganic filler is equal to or greater than the thickness of the coating on the substrate following step f.

4. The process of claim 1 wherein said inorganic filler comprises a pigment.

5. The process of claim 4 wherein said pigment comprises aluminum flakes.

6. The process of claim 1 wherein the particle size of the powder of step c. is similar to the particle size of the inorganic filler of step d.

7. The process of claim 1 wherein the particle size of the powder that forms the second layer is similar to the particle size of the powders that form the first layer.

* * * * *